United States Patent Office 2,726,223
Patented Dec. 6, 1955

2,726,223
MODIFIED POLYESTER RESINS

Pierre Alfred Talet, Paris, France, assignor to Societe Nobel Francaise, Paris, France, a joint-stock company of France No Drawing. Application October 21, 1952,
Serial No. 316,070

Claims priority, application France February 18, 1952

13 Claims. (Cl. 260—32.8)

It is known that contact resins containing a polyester of maleic acid and a polyhydric alcohol associated with various polymerizable products often have the drawback of offering a tacky surface after polymerization, of retaining a certain solubility in organic solvents and of lacking in surface hardness.

The object of the present invention is to add to a mixture of polyester of maleic acid and a polyhydric alcohol, and of a polymerizable monomer, either allylmethylolurea, or hexa-hydro-1-3-5-triacrylyl-s-triazine. The incorporation of one or the other of these adjuvants or the simultaneous incorporation of both products causes the aforementioned defects to disappear.

An improvement of maleic resins, within the scope of the present invention, consists in adding a monoalcohol maleate to a polyester of maleic acid and a polyhydric alcohol forming the basis of the resin. This monoalcohol maleate has the advantage of bringing the viscosity of the mass to the desired value without its being necessary to introduce an important amount of monomer or of non polymerizable solvents.

Allylmethylolurea is a compound having the following formula:

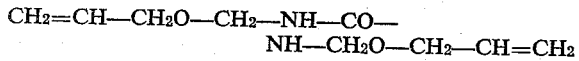

In common with all methylolurea derivatives, this product can be transformed with condensation. Moreover, by reason of the double allyl bonds, a polymerization is possible.

For the uses forming the object of the invention, the diallyl ether of dimethylolurea is prepared in a form as close as possible to the simple formula given above. It is difficult to avoid a certain condensation; however provided this transformation does not involve an exaggerated increase of viscosity, it is not detrimental to the part which the product must play in the mixture of constituents.

The presence of allyl derivatives of dimethylolurea in mixtures containing glycol maleate is favourable to hardening, enables a non-tacky surface to be obtained, even in the presence of air, and increases surface hardness. The percentage to be used varies according to the properties required from the final resin.

The triazinic derivative having the formula:

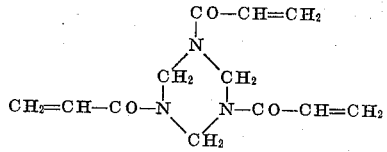

confers specific properties to the mixture of the polyester of maleic acid and a polyhydric alcohol and of polymerizable monomer, as does the allyl derivative of dimethylolurea. This compound (hexa-hydro-1-3-5-triacrylyl-s-triazine) produces a definite action already with very low percentages. The acceleration of the polymerization is more pronounced than in the case of dimethylolurea allyl ether.

Mixtures of maleic alkyde of monomer and of products such as dimethylolurea diallyl ether or of hexa-hydro-1-3-5-triacrylyl-s-triazine are used not only for obtaining cast bodies or laminated products, but they are also useful in the manufacture of various varnishes, paints and coatings. Their behaviour in regard to solvents and acids are particularly apparent in these uses.

Without restricting the invention in any way, the following examples will better illustrate the scope of the invention:

Example 1

100 parts of glycol maleate having an acid number of 80 are diluted with 6 parts of butyl maleate. This constitutes mixture I.

On the other hand, 12 gr. of methylolurea diallylether, containing 5% butyl maleate, are dissolved in 15 gr. of styrene and 15 gr. of vinyl acetate. This constitutes mixture II.

I and II are then mixed, which leads to a mass having a viscosity of 5.5 poises at the temperature of 25° C.

After addition of 1% benzoyl peroxide, the mass cast into a glass tube is transformed into a gel in 2 hours 15 minutes at 70° C.

If cotton, glass or asbestos fabrics are impregnated with about 50% resin, laminated structures are obtained having a satisfactory hardness as well as satisfactory resistance to heat and water. The mechanical strength varies according to the support used. The pressing temperature may extend from ordinary temperature to 150° C.

When pressing at ordinary temperature, it is necessary to add known polymerisation agents in order to start the reaction mechanism already at ordinary temperature.

It is preferable, as regards the properties of the final product obtained, to operate at 135° C. in the presence of a polymerisation catalyst such as benzoyl peroxide. The pressing lasts about 30 minutes and is preceded by a pre-heating for a period of 10 to 15 minutes.

Example 2

Identical mixture to that of Example 1 but the maleate employed has an acid number of 40. The speed of polymerisation is accelerated due to the lowering of this number. If the temperatures of Example I are maintained, all the periods of time must be appreciably reduced.

Example 3

Mixture I.—Use is made of a maleate having an acid number equal to 80.

To 100 parts of maleate are added 5 parts of butyl maleate, 1 part of hexa-hydro-1-3-5-triacrylyl-s-triazine and 5 parts of acetone.

Mixture II.—20 parts of strongly condensed butylated urea formaldehyde condensation product (known commercially by the name of "Nobelamine 24602") are dissolved at 70° C. in 30 parts of styrene. The butylated urea formaldehyde condensation product is a substantially colorless viscous liquid having a viscosity in the range of 17–34 poises at 25° C., an acid number of 4.5 and a specific gravity of 1.034.

The viscosity of mixture I plus II is equal to 3 poises at a temperature of 25° C.

After having incorporated 1% benzoyl peroxide, the mass hardens in 70 minutes at 70° C.

Laminated structures on felt or on fabric may be produced as in Example I; however, due to the lesser viscosity of the mixture of resins, the charge may be greatly increased. Thus, it has been possible to impregnate glass fabrics so as to obtain, after a 15 minutes' pre-heating and a 30 minutes' pressing at 135° C. under 10 kg./cm.², a complex containing 70 parts glass for 30 parts resin.

These complexes rich in glass are very hard and exhibit excellent mechanical strength. The speed of hardening and the hardness are increased as the contents in triazinic derivative increase. In order that the triazinic derivative may confer to the mass all the desirable properties, it is preferable to bring the mass to a temperature exceeding 100° C.

What I claim is:

1. The process for the manufacture of contact resins from a mixture of a polyester of maleic acid and a polyhydric alcohol and of a copolymerizable monoethylenic monomer, comprising adding to said mixture a compound selected from the group consisting of hexahydro-1-3-5-triacrylyl-s-triazine and dimethylolurea diallyl ether and a solvent therefor, and polymerizing the resulting mixture by addition of benzoyl peroxide and maintaining the mixture at a temperature of 70° C.

2. The product produced by the process of claim 1.

3. The process for the manufacture of contact resins from a mixture of a polyester of maleic acid and a polyhydric alcohol and of a copolymerizable monoethylenic monomer, comprising adding to said mixture hexahydro-1-3-5-triacrylyl-s-triazine and a solvent therefor, and polymerizing the resulting mixture by addition of benzoyl peroxide and maintaining the mixture at a temperature of 70° C.

4. The product produced by the process of claim 3.

5. The process for the manufacture of contact resins from a mixture of a polyester of maleic acid and a polyhydric alcohol and of a copolymerizable monoethylenic monomer, comprising adding to said mixture dimethylolurea diallyl ether and a solvent therefor, and polymerizing the resulting mixture by addition of benzoyl peroxide and maintaining the mixture at a temperature of 70° C.

6. The product produced by the process of claim 5.

7. The process of claim 1 wherein the copolymerizable monomer is selected from the group consisting of vinyl acetate, butyl maleate and styrene.

8. The process for the manufacture of contact resins, comprising admixing a mixture of 100 parts of a polyester of maleic acid and a polyhydric alcohol, 5 parts of butyl maleate, 1 part of hexa-hydro-1-3-5-triacrylyl-s-triazine, and 5 parts of acetone with a mixture of 20 parts of a butylated urea formaldehyde condensation product dissolved in 30 parts of styrene, and polymerizing the resulting mixture by addition of 1% benzoyl peroxide and maintaining the mixture at a temperature of at least 70° C.

9. The product produced by the process of claim 8.

10. The process for the manufacture of contact resins comprising admixing a mixture of 100 parts glycol maleate having an acid number in the range of 40 to 80, and 6 parts butyl maleate with a mixture of 12 parts dimethylolurea diallylether, 5 parts butyl maleate, 15 parts styrene and 15 parts vinyl acetate, and polymerizing the resulting mixture by addition of 1 part benzoyl peroxide and maintaining the mixture at a temperature of at least 70° C.

11. The product produced by the process of claim 10.

12. The process for the manufacture of contact resins from a mixture of a polyester of maleic acid and a polyhydric alcohol and a copolymerizable monoethylenic monomer comprising adding to said mixture hexahydro-1-3-5-triacrylyl-s-triazine dissolved in styrene as a solvent therefor and polymerizing the resulting mixture by the addition of benzoyl of peroxide and maintaining the mixture at a temperature of 70° C.

13. The product produced by the process of claim 12.

References Cited in the file of this patent

UNITED STATES PATENTS

| | | |
|---|---|---|
| 2,335,701 | Root | Nov. 30, 1943 |
| 2,442,747 | Auten et al. | June 8, 1948 |
| 2,510,503 | Kropa | June 6, 1950 |
| 2,559,694 | Zerner et al. | July 10, 1951 |
| 2,598,663 | Kropa | June 3, 1952 |